United States Patent [19]
Berger

[11] 3,989,028
[45] Nov. 2, 1976

[54] COAL GRATE CONSTRUCTION FOR GAS-FIRED GRILLS

[75] Inventor: Bernard B. Berger, Aiken, S.C.

[73] Assignee: Ducane Heating Corporation, Columbia, S.C.

[22] Filed: Nov. 10, 1975

[21] Appl. No.: 630,681

[52] U.S. Cl. .............................. 126/41 R; 126/25 R; 99/446
[51] Int. Cl.² .......................................... A47J 37/07
[58] Field of Search ........... 126/25 R, 41 R; 99/444, 99/446, 447

[56] References Cited
UNITED STATES PATENTS

| | | | |
|---|---|---|---|
| 2,898,846 | 8/1959 | Del Francia | 99/444 X |
| 2,940,381 | 6/1960 | Cottongim et al | 126/25 R |
| 3,245,398 | 4/1966 | Baker | 126/25 R X |
| 3,396,716 | 8/1968 | Weyland et al | 126/25 R X |
| 3,552,301 | 1/1971 | McNeff | 126/25 R X |
| 3,931,805 | 1/1976 | Nelson | 126/25 R X |

*Primary Examiner*—William R. Cline
*Attorney, Agent, or Firm*—Townsend M. Belser, Jr.

[57] ABSTRACT

A portable gas-fired barbecue unit having a grate assembly for supporting a bed of ceramic coals between a gas burner and a cooking grill. The grate assembly includes upper stringers having a central channel to catch food drippings and side flanges to support the ceramic coals. Lower stringers with channels are arranged to catch any drippings missed by the upper stringers. All stringers are sloped toward one end where means is provided to collect the drippings. The assembly intercepts both food drippings and gas combustion products to produce radiant cooking energy and flavoring smoke while catching excess drippings to prevent fouling of the burner.

11 Claims, 7 Drawing Figures

COAL GRATE CONSTRUCTION FOR GAS-FIRED GRILLS

BACKGROUND OF INVENTION

The present invention relates generally to gas-fired barbecue grills and more particularly to an improved construction for the type of barbecue grill employing or refractory briquets heated to incandescence by an underlying gas burner.

In conventional barbecue grills, the cooking or food holding grill is usually suspended directly over a suitable source of heat, such as charcoal or gas heated ceramic briquets. As the food, especially meat products, is cooked, juices that are removed during the cooking process drip upon the hot coals and produce a flavoring smoke which imparts a charcoal or barbecue flavor to the foodstuff. Gas-fired barbecue grills of the type mentioned have in the past employed a bar type grate with parallel wire or rod-like stringers for holding the ceramic coals above the gas burner. A cooking grill of similar construction is then positioned to hold the foodstuff over the resulting bed of ceramic coals.

One of the major problems encountered with such prior art grills is that a portion of the drippings are not incinerated and therefore filter down through the coal bed and drip onto the gas burner, clogging and otherwise fouling the gas ports. One prior are solution to this problem has been to shield the gas ports by mounting baffles of various types on the burner. Such baffles usually include an overlying shelf of lip arranged to cover the burner ports from above. These solutions trap unburnt gases under the shield and cause impingement of burner flames against the shield, resulting in incomplete combustion and inefficient burner operation.

Although cooking grills with grooved members have been used to support the food itself, such grills defeat the flavoring function of barbecue grills and introduce problems of their own. Cooking grills employing grooved members do not allow any fat or drippings to contact the heated coals as necessary for the production of flavoring smoke. Furthermore, the use of wide channel members immediately adjacent to the foodstuff shields food surfaces from cooking heat and interferes greatly with the cooking process. Besides substantially reducing the cooking rate, frequent movement of the foodstuff is required to expose those shielded portions. All of the foregoing disadvantages are voided through the use of the present invention which optimizes the heating and flavoring functions of a barbecue grill while fully protecting the underlying heat source.

SUMMARY OF INVENTION

It follows from the foregoing background and prior art that what is needed is a gas-fired barbecue grill which provides radiant and convective heat and flavoring smoke for cooking the foodstuff while at the same time preventing food drippings from fouling the gas burner and collecting on and corroding the bottom of the grill housing itself. These objectives are accomplished by a coal grate having two rows of stringers with grease collecting channels vertically displaced from, and staggered relative to, each other. The top row supports the bed of ceramic coals while at the same time draining off excess drippings falling past the coals into the collecting channels. The bottom row has similar collecting channels positioned to catch drippings falling past the stringers of the top row. Flanges along the upper edge of each stringer provide flat surfaces for supporting a plurality of coals in a bed of relatively uniform depth and without damage to individual coals.

The entire grate assembly is tilted slightly toward one end of the stringers so that liquid drippings can drain off in the direction of the slope into a collecting trough or container which may then be emptied as needed. The transverse space between stringers in the same row and the vertical spacing of the two rows are sufficient to permit conbustion products and convection heat to pass freely through the grate and maintain the coal bed at radiant heating temperatures. The novel coal grate thus provides optimum cooking and flavoring conditions at the food grill, while draining off excess drippings. The necessity of shielding the gas burner itself is thereby eliminated. Modifications of the basic invention optimize the vertical spacing between the two sets of stringers and disclose both solid and apertured channel constructions of mounting frames for the stringers.

Accordingly, a principal object of the present invention is to provide an improved gas-fired barbecue grill of the type employing a bed of incandescent ceramic coals or briquets heated from below by a gas burner.

Another object of the invention is to provide an improved coal grate for distributing gas combustion products evenly under a bed of coals and directing them upward through the bed with minimum restriction of flow while intercepting drippings falling from foodstuffs on an overlying cooking grill.

A further feature of the invention is the provision of a coal grate for preventing food drippings from clogging or fouling the ports of an underlying gas burner so that separate shields for that purpose are not required.

Another feature of the invention is the provision of a coal grate allowing food drippings to reach heated coals to produce flavoring smoke without contacting and fouling underlying burner or housing surfaces.

Yet another object of the present invention is to provide a coal grate wherein channel stringers are spaced transversely apart by distances less than the minimum dimension of undamaged refractory coals and individual stringers include upper flanges to support the coals without chipping or other damage to the body thereof.

Yet a further object of the invention is to provide a barbecue grill having refractory bed supporting means in combination with grease collecting means whereby melted grease passing through the bed is caught and removed from the barbecue grill for subsequent disposal before reaching the heat source.

Still another object of the present invention is the provision of a coal grate for ceramic lumps that permits radiant energy, convective heat and flavoring smoke to impinge upon cooking foodstuffs while preventing drippings from the foodstuffs from contacting the source of convective heat.

Yet a further object of the present invention is to provide a portable barbecuing unit wherein the cooking grill and the coal cooperate to incinerate food drippings from the grill on coals held by the grate and collect excess drippings for disposal, and wherein the grill and the grate are arranged to be readily diassembled for cleaning and reassembled for use.

In addition to the numerous advantages from the foregoing discussion, the present invention has the further advantages of simplicity, ruggedness, durability and ease and economy of construction and manufacture. The invention provides a practical, efficient and reliable unit for barbecuing a wide variety of food products. The unit can be constructed from standard stock materials that can be shaped and assembled with relatively few machine operations. The exact nature of the invention, as well as other objects and advantages, will be readily apparent from the annexed drawings and the following specific description of the preferred embodiments of the invention.

DESCRIPTION OF DRAWINGS

For a better understanding of the present invention, reference is made to the accompanying drawings, in which.

DETAILED DESCRIPTION OF PREFERRED EMBODIMENTS

Figure 1:
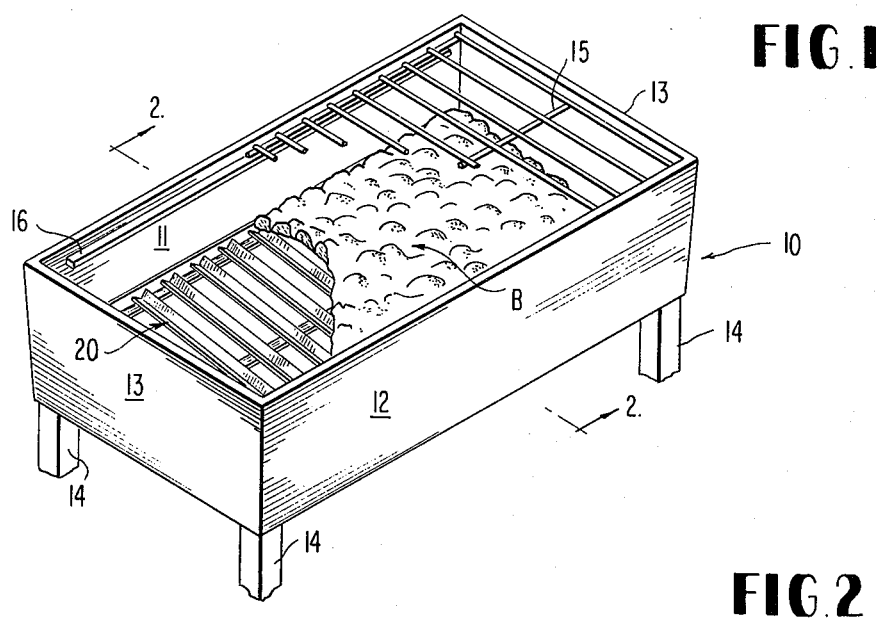
FIG. 1 is a perspective view of a barbecue unit employing the novel coal grate assembly of the present invention.
Figure 2:
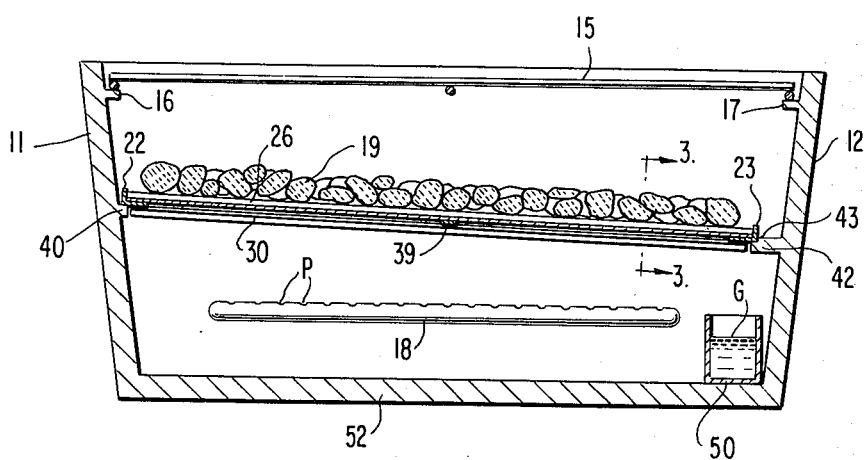
FIG. 2 is a side elevation of the invention taken along line 2—2 of FIG. 1 and shows interior features of the grill, including structural details of the coal grate assembly as mounted within the housing between the gas burner and the cooking grill.

Referring now to the drawings, particularly to FIGS. 1 and 2, there is illustrated one form of gas-fired barbecue grill made according to the present invention. The barbecue grill housing, generally designated 10, comprises an open top pan having a front wall 11, a rear wall 12, and a pair of side walls 13—13, and is supported upon four legs 14, one at each corner. A cooking grill 15 is provided across the top of the housing and consists of a plurality of spaced parallel rods secured together by several crossrods in conventional fashion. The cooking grill is mounted adjacent to the top edge of the housing by means of a forward ledge 16 on front wall 11 and a back ledge 17 on rear wall 12 and is arranged substantially horizontal to hold foodstuffs over a source of cooking heat. The cooking area of the unit is thus defined by the upper surface of the grill.

A gas burner 18 having gas discharge ports P is mounted in conventional fashion without the housing adjacent to its bottom wall 52. Between grill 15 and gas burner 18 is a coal grate assembly, generally designated 20, for supporting a bed of ceramic or refractory lumps or coals 19 in position to serve as a source of radiant cooking heat. Coal grate assembly 20 is detachably supported along its front edge by ledge 22 on front wall 11 at its rear edge by two or more projecting lugs 42 proportionately spaced along rear wall 12.

Figure 3:
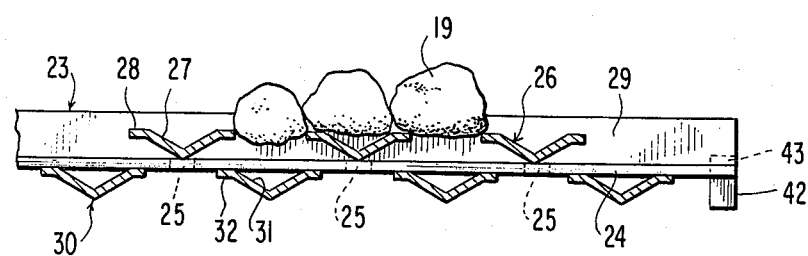
FIG. 3 is a fragmentary front elevation taken along line 3—3 of FIG. 2 and shows structural details of the stringer and frame components of the coal grate assembly.

As best illustrated in FIG. 3, coal grate 20 includes an upper row of parallel stringers 26 and a lower row of parallel stringers 30. Each of the stringers 26 has a V-shaped channel portion 27 and outwardly projecting flange portions 28—28 along the upper edge of the channel sidewalls. Flanges 28—28 preferably extend in a direction normal to the symmetrical plane of the channel which bisects its V-shaped cross section. The stringers 30 of the second row have a similar V-shaped channel and similar flanges 32—32 since the stringers of both rows are preferably made from the same stock. The stringers extend from the front to the rear of the grate and those of the first row are spaced transversely apart by a distance substantially less than the minimum dimension of the smallest coal shape to be employed on the grate. The stringers in the second row are sized and positioned to underlie the space between those of the first row in a staggered relationship. The two rows are spaced vertically apart by a distance sufficient to permit the combustion products of burning gas to pass freely therebetween. This arrangement of flanged, V-shaped stringers evenly distributes the hot product gases beneath the coal bed so as to provide relatively uniform heating.

The two rows of stringers, 26 and 30, are secured together by means of a front crossbrace 22 and a rear crossbrace 23, each comprised of a section of angle iron stock. A middle crossbrace 39 of flat stock may also be employed to secure the stringers together at a point intermediate to their ends. With reference to FIG. 2, forward ledge 40 engages forward angle iron 22 and angle iron 23 is engaged by rear lugs 42. In order to hold the coal grate in its proper front to rear position, the bottom rear corner of member 23 fits within a notch 43 at the forward upper edge of lugs 42—42.

The relative heights of forward ledge 40 and rear lugs 42 are such that the coal grate assembly 20 slopes slightly downward from front to rear so that liquid fat or drippings falling within channels 27 and 31 will flow toward the rear of the grate and fall into an elongated container or trough 50 resting upon bottom wall 52. This container lies beneath the rear of the coal grate for its full width and is detachable from the housing so that when filled with grease G, it can be readily moved, emptied and replaced for further use. In order to provide a direct path of flow between the upper row of stringers 26 and the grease collection container 50, the horizontally disposed leg 24 of angle iron 23 contains a series of apertures 25 adjacent to the discharge end of each stringer as shown in FIG. 3.

The width and spacing of the individual stringers in each row of the grate assembly is a pertinent feature of the invention. The width of the upper stringers is selected to approximate the minimal body dimension contemplated for the coals to be used in the bed of refractory material. As indicated above, adjacent stringers in the same row are then spaced apart by a distance substantially less than the coal size. Thus, in the preferred embodiment, a spacing of three-eighths of an inch is used for stringers five-eighths of an inch in width. With this spacing, undamaged briquets will be supported by the upper row of stringers alone and will not fall down in between the two rows so as to block the gas passages therebetween. These stringers also have a one-eighth inch flange on each side of the channel portion. The edge-to-edge distance of the channel portion of the stringer therefore approximates the spacing between stringers so that the ceramic lumps rest upon the upper surfaces of the flanges and will not fall down into the stringer channels. With the major weight of the bed carried by the flanges 28, there are no sharp edges to chip or otherwise damage the briquets and produce fragmentary material which could fall below the first row and thereby interfere with convection heat flow.

For economy of construction, the same stringer cross-section is employed for the lower stringers although flanges are not required and other channel stock can be used. Furthermore, projecting flanges 32 provide a surface to which cross members can be readily attached, such as by welding or the like. Also, upper stringers 26 preferably abut the upstanding leg 29 of the angle iron brace so that flanges 28 can be welded to the end braces, although spot welding at the channel bottom will suffice. The lower stringers 30 are positioned relative to the upper stringers 26 so that the cross-section of channel portion 31 extends fully across the space beneath the edges of the two immediately adjacent upper stringers. The direct line distance between adjacent stringers in different rows should be equal to or greater than one-half of the transverse spacing between the upper stringers to insure that the passages around the lower stringers do not unduly restrict upward flow of gaseous combustion products. In the preferred embodiment, flanges 28 on the upper stringers overlap underlying flanges 32 on the lower stringers for the full flange width as illustrated in FIG. 3. This insures that all grease bypassing the upper row will be retained by the lower row. An overlap of at least one-eighth of an inch is desirable because of the tendency of food drippings and grease to splatter when contacting ceramic surfaces heated to incandescent temperatures.

Figure 4:
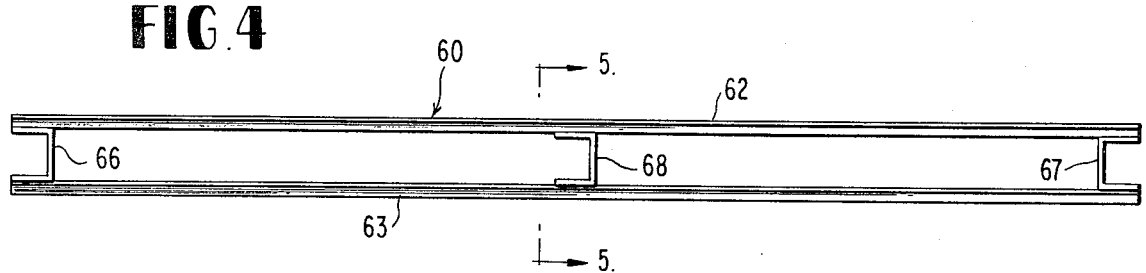
FIG. 4 is a side elevation of a modification in the coal grate assembly.
Figure 5:
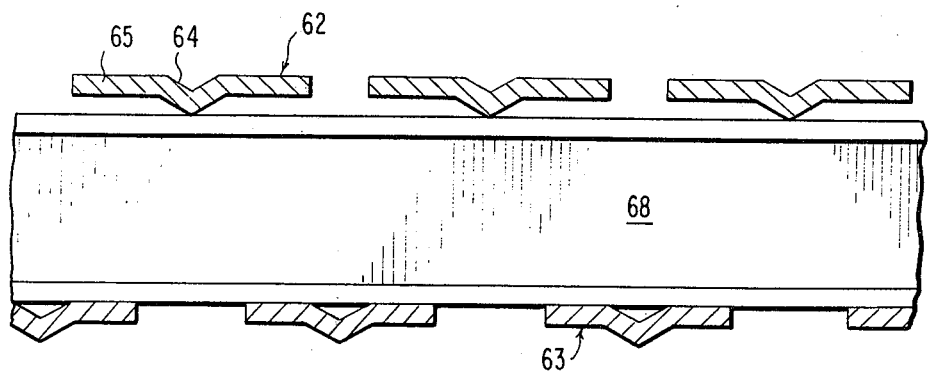
FIG. 5 is a fragmentary front elevation of the modified coal grate assembly taken along lines 5—5 of FIG. 4 and shows structural details of assembly components.

Now with reference to FIGS. 4 and 5, there is illustrated a modification of the invention wherein a coal grate 60 is substituted for the coal grate 20 of FIGS. 1 through 3. The coal grate 60 is comprised of an upper row of stringers 62 and a lower row of stringers 63 spaced vertically apart by forward cross brace 66, rear cross brace 67 and central cross brace 68, all of channel iron stock. The channel iron construction illustrated in these figures increases the vertical spacing between the upper and lower rows of stringers and thereby enhances the free flow of combustion gases therebetween.

The lower stringers 63 are staggered relative to the upper stringers 62 in the same manner previously described. However, in this embodiment, the ratio of flange width to channel width has been increased from 3 to 1 to about 1 to 1 such that the width of each side flange 65 approximates the distance between the upper edges of channel 64. This increase in the surface area of the projecting side flanges further enhances the capability of the upper row of stringers to support a heavy load of briquets without damage or fall through during prolonged use. Use of shallower channels 64 also allows the upper stringers to be secured to the adjacent channel brace leg by a weld bead between the underside of flange 65 and the adjacent surface of the brace, all of which further enhances the load-bearing characteristics of the upper row of stringers.

Figure 6:
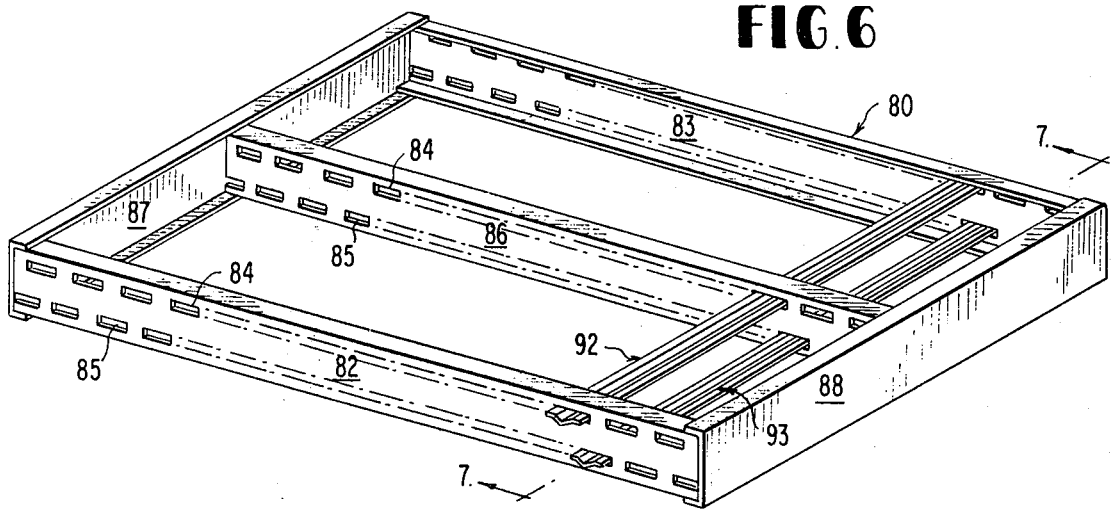
FIG. 6 is a perspective view of another modification in the coal grate assembly of the present invention.
Figure 7:
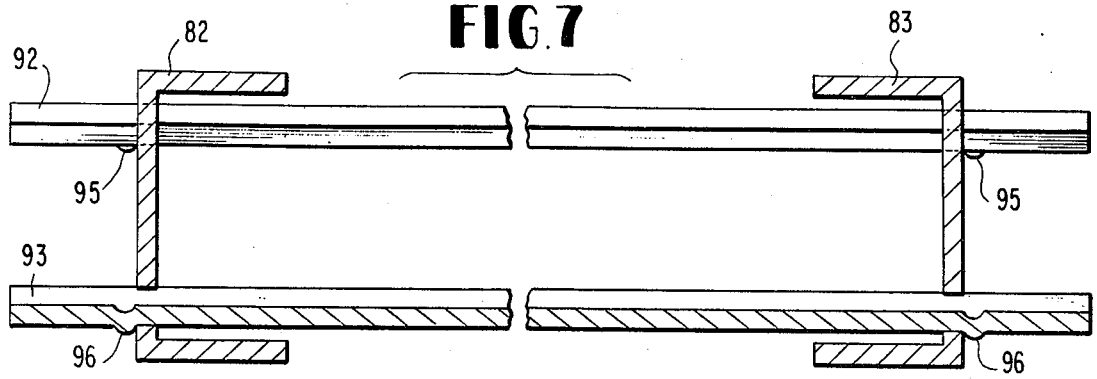
FIG. 7 is a fragmentary side elevation of the modification of FIG. 6 and shows details of assembly components, including one means of detachably securing removable stringers within the coal grate frame.

With reference to FIGS. 6 and 7 of the drawings, there is shown a second modification of the invention wherein the upper and lower rows of stringers are detachably mounted within the cross braces of the supporting frame. Thus, front brace 82, rear brace 83 and central brace 86 all have two sets of apertures, an upper set 84 to receive stringers 92 and a lower set 85 to receive stringers 93 as illustrated in FIG. 6. The lateral support necessary for this frame embodiment is provided by a left side channel 87 and a right side channel 88 which are rigidly secured to opposite ends of each cross brace by welding or the like.

The resulting coal grate frame, generally designated 80, thus has aligned slots in each cross brace to support the two sets of stringers. Each upper stringer is secured between front brace 82 and rear brace 83 by means of a locking dimple or detent 95 pressed into the bottom of the channel portion near each end. When the stringer is in place, the detent at each end is positioned just beyond and adjacent to the outer face of the corresponding cross brace as illustrated in FIG. 7. In this position, longitudinal movement of the stringer is prevented by frictional engagement between the detents and adjacent outer surfaces of the cross braces. Normal operational loading will not depress the detents. However, when the stringers are to be removed for replacement or cleaning, the dimples can be forced inward so as to pass through the apertures, allowing the stringers to be withdrawn longitudinally from the coal grate frame. A similar pair of locking dimples 96—96 are employed on each of the lower stingers, permitting that row to be detached from the frame in the same fashion.

It is to be understood that the coal grate assembly of the present invention can be used in a wide variety of gas-fired grill designs as long as supporting means for the grate provides the slope necessary to permit gravity flow of the food drippings along the stringer channels. The downward slope, of course, can be either toward the rear of the grill as shown in the drawings or toward the front. The stringers may also run from side to side with a downward slope to either side, all depending upon the desired position of the container or conduit for collecting and disposing of excess grease. In that regard, grooves or troughs in the housing wall may be employed in lieu of a container within the housing to collect grease in a manner similar to that disclosed for collecting grease from a cooking grill as shown in the U.S. Pat. to McNeff, No. 3,552,301, of Jan. 5, 1971. Similarly, the rear of the coal grate may be supported by a grease collecting trough suspended within the grill housing in a manner similar to that disclosed in my copending application, on a Gas-Fired Barbecue Unit, Ser. No. 608,909, filed on Aug. 29, 1975.

In operation, the bed of ceramic lumps or coals is first heated to incandescence by bottled gas distributed and burnt thereunder by burner 18. The foodstuff to be cooked, such as steaks or hamburger patties, is then placed on the cooking grill 15 in the usual fashion. Thereafter, during the cooking process, juices flowing from the meat fall onto the hot coals where they are incinerated to produce smoke and vapor which rises to impinge upon the foodstuff, thereby imparting a charcoal or barbecued flavor thereto. A barbecue flavor is enhanced by the use of a sauce on the foodstuff, some of which is incinerated along with the juices. However, a portion of the drippings either bypasses the coals or drips therefrom before burning. Any such runoff is caught by either the first or second row of stringers and flows down the channels thereof to collect in the container 50. A portion of the juices and sauce reaching the coal grate stringers is vaporized before it can reach the end of the channels to produce additional smoke and vapor that further enhances the flavor of foodstuff cooking on the grill. The invention has proven highly effective in preventing drippings from reaching the underlying gas burner while maintaining the efficiency of convective heat transfer to the overlying coals. Burner fouling is avoided even with bacon and other foods of high fat content which maximize the amount of grease reaching the underlying stringers.

Although but a few embodiments of the present invention have been described, other embodiments and variations will occur to those skilled in the art. It is possible, of course, to use various features of the specific embodiments described, either separately or in various combinations, and such uses are within the contemplation of the present invention. Furthermore, many structural changes are possible and those changes are intended to be within the scope of this disclosure. For example, channel shapes other than V-shaped may be employed, such as rectangular or semi-circular. It is also to be understood that the foregoing drawings and specifications merely illustrate and describe the preferred embodiments of the invention and that other embodiments are contemplated within the scope of the appended claims.

What is claimed is:

1. A gas-fired cooking unit for grilling food over a radiant bed of refractory coals comprising sidewalls defining a heating enclosure; a food holding grill supported adjacent to the top of the enclosure; a coal grate assembly mounted within the enclosure for supporting a bed of refractory coals below the cooking grill in position to direct radiant cooking heat upward toward the food holding area of the grill; burner means supported below the coal grate assembly for burning flammable gas to heat the bed of refractory coals to incandescent temperatures; said coal grate assembly including an upper grate having a plurality of elongated stringers spaced transversely apart and sloped downwardly toward one end, each upper stringer including channel means for catching and conveying to said downward end food drippings passing through the coal bed without incineration, a lower grate having a plurality of elongated stringers spaced transversely apart and sloped downwardly toward one end, said lower grate being mounted in spaced relation below said upper grate to provide passageways for upward flow of hot combustion products produced by burning gas and said lower stringers including channel means positioned relative to said upper channel means to catch and convey to said downward ends food drippings passing through both said coal bed and said upper grate without incineration; and collector means for receiving food drippings from the downward ends of the stringers of both grates.

2. A cooking unit according to claim 1 wherein said upper channel means comprises an upturned channel having opposing sidewalls and the upper stringers which include an outwardly projecting flange extending longitudinally along the upper edge of each channel sidewall to provide substantially flat supporting surfaces for the coals of said refractory bed.

3. A cooking unit according to claim 2 wherein said longitudinal flanges have a transverse width at least equal to the transverse distance between the upper edges of said channel sidewalls.

4. A cooking unit according to claim 1 wherein the transverse spacing between adjacent upper stringers is less than the minimum dimension of individual refractory coals so that the radiant bed is supported exclusively by stringers of the upper coal grate.

5. A cooking unit according to claim 4 wherein the stringers of the same grate extend substantially parallel to each other and are within substantially the same plane and the stringers of the lower grate are spaced from the stringers of the upper grate by a distance at least equal to one-half of the transverse spacing between stringers of the upper grate.

6. A cooking unit according to claim 5 wherein the upper stringers are spaced transversely apart at a uniform distance of less than the transverse width of the lower stringers and the lower stringers are staggered relative to the upper stringers so that individual lower stringers are vertically aligned with the space between adjacent upper stringers and each lower stringer underlies two adjacent upper stringers in overlapped relationship.

7. A cooking unit in accordance with claim 1 wherein said grate assembly includes frame means for mounting the stringers of the upper grate with respect to each other and the stringers of the lower grate relative to the upper stringers so that the channel means of the lower stringers are positioned to receive food drippings bypassing the upper grate, and mounting means for detachably supporting said frame means within said heating enclosure with the stringers of both grates downwardly sloped.

8. A cooking unit according to claim 7 wherein said frame means includes a front cross member and a rear cross member extending transversely across the stringers of said grates and spaced longitudinally apart toward opposite ends of said stringers, and means for securing each of said stringers to said frame members at each transverse juncture between said members and said stringers.

9. A cooking unit according to claim 8 wherein each of said cross members contains two rows of apertures spaced vertically apart, the upper row being arranged to receive and support the stringers of said upper grate intermediate to their ends and the lower row being arranged to receive and support the stringers of said lower grate intermediate to their ends, and wherein said grate assembly includes locking means for detachably securing said stringers within the apertures of said cross members.

10. A cooking unit according to claim 9 wherein said stringer locking means comprises a pair of detents carried by each stringer with one detent near each end thereof, the detents toward the front end of each stringer being arranged to engage the front cross member adjacent to the apertures thereof and the detents toward the rear end of each stringer being arranged to engage the rear cross member adjacent to the apertures thereof.

11. A method of cooking and flavoring food with a bed of refractory coals which comprises the steps of supporting the food to be cooked upon a horizontally disposed openwork grill, supporting a coal grate assembly below said grill in the path of drippings cooked from the food, arranging a bed of refractory coals upon said grate to direct radiant cooking heat toward the food on said grill, heating said bed of refractory coals to incandescent temperatures with combustion products of burning gas, incinerating a portion of said drippings to produce a flavoring smoke and directing said smoke past said food, collecting the remaining portion of said drippings in elongated channels mounted on said grate below said coal bed and downwardly sloped towards one end for gravity flow of said drippings, a first set of said channels being arranged to support said refractory bed and a second set of channels being arranged to collect drippings passing by said first set of channels, and supporting a container below the downward end of said channels to receive said collected drippings.

* * * * *